E. J. YOUNGQUIST.
PROPELLER.
APPLICATION FILED MAR. 4, 1918.
1,349,403.
Patented Aug. 10, 1920.
2 SHEETS—SHEET 2.
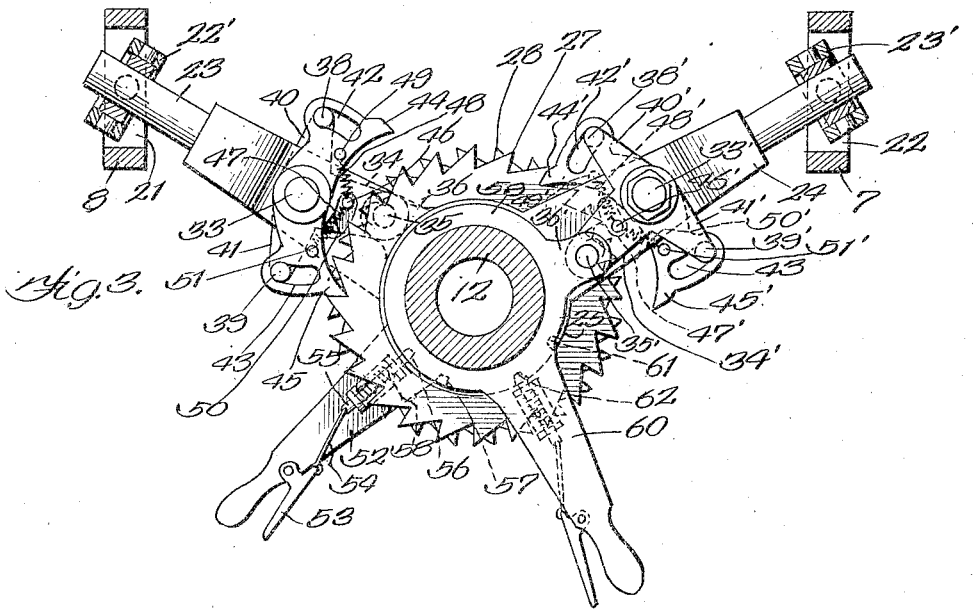

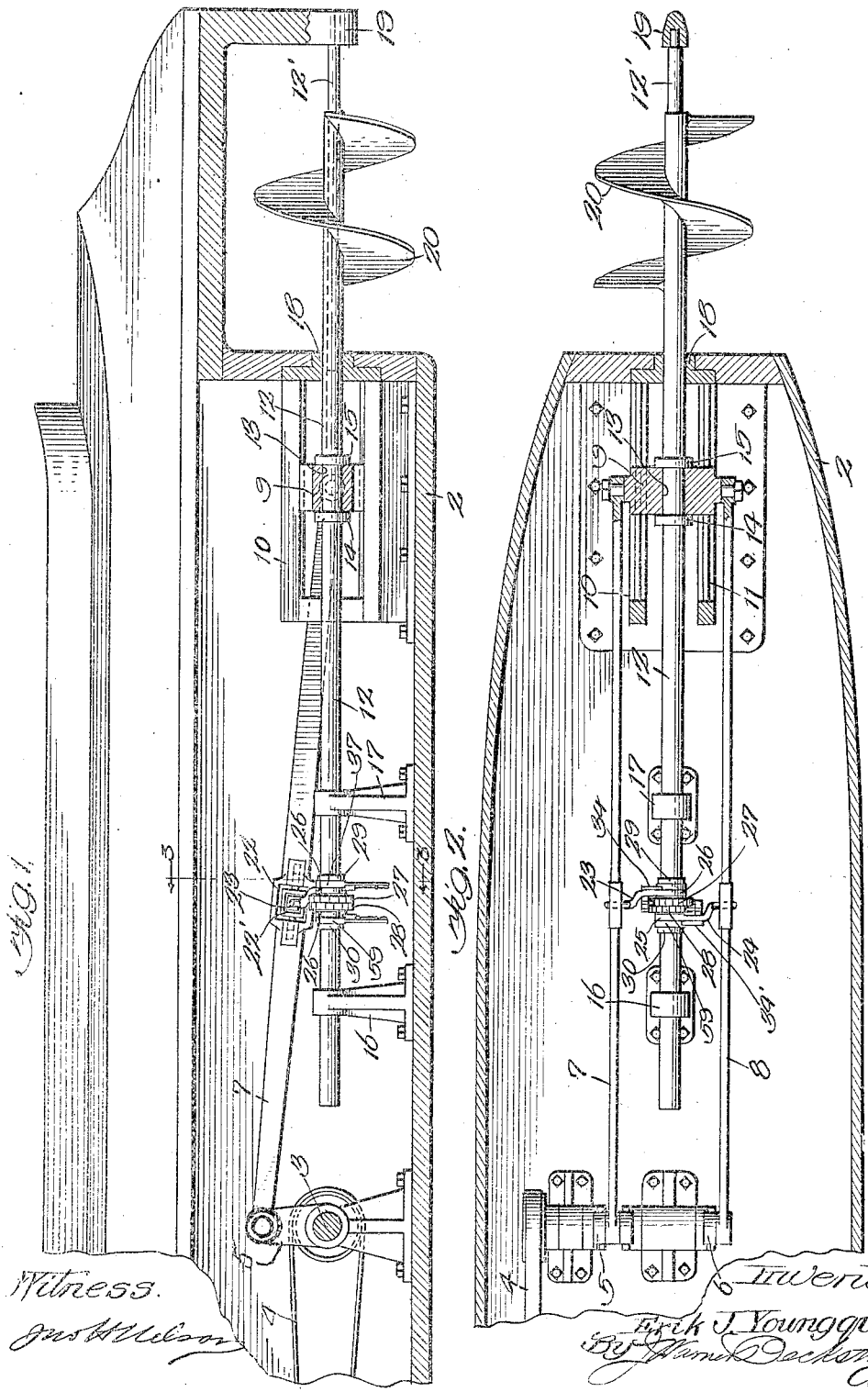

UNITED STATES PATENT OFFICE.

ERIK J. YOUNGQUIST, OF CHICAGO, ILLINOIS.

PROPELLER.

1,349,403.  Specification of Letters Patent.  Patented Aug. 10, 1920.

Application filed March 4, 1918. Serial No. 220,332.

*To all whom it may concern:*

Be it known that I, ERIK J. YOUNGQUIST, a citizen of the United States, residing at Chicago, in the county of Cook and State of Illinois, have invented certain new and useful Improvements in Propellers, of which the following is a specification.

My invention relates to propelling mechanisms for ships, and has particular reference to their use in driving sea or marine vessels. The object of the present invention is to derive increased propelling power and speed with the aid of the screw propeller by operating the latter both as a screw and as a direct thrust disk or paddle having reciprocal movement on the axis of the screw. In the present invention the thrust movements are effected simultaneously with the rotary movements, but the latter are made constantly variable in inverse ratio to the variations in the thrust movements, which, in the present embodiment of my invention, are accomplished with the aid of a crank or a plurality thereof. The lateral or swinging movement of the pitman or connecting rod is converted into a rotary movement in the propeller shaft, which rotary movement is at its maximum when the crank thrust is least, or when passing the dead centers, whereby the inequalities of crank thrust movements are compensated for by corresponding, but opposite, ratios of variations in the screw's rotations.

For the purpose of more clearly illustrating my invention I have in the accompanying drawings shown one of the simpler of several mechanisms which I have provided for carrying out the above mentioned propeller movements and actions, a variety of means being, for instance, available for changing the angular movement of a pitman into rotary movement in a shaft.

In the drawings:—

Figure 1 is a side elevation, partly in section, of a boat or vessel with my invention applied thereto.

Fig. 2 is a plan view of same.

Fig. 3 is an enlarged section taken substantially on line 3—3 of Fig. 1 and showing the mechanism whereby I convert the swinging movement of the pitman into a rotary movement in the propeller shaft.

Fig. 4 is a plan view of Fig. 3, the couplings or connections with the crank-pitmen being shown in section.

Figs. 5 and 6 are two views of a boat on a reduced scale showing the propeller in different thrust movement positions.

Fig. 7 is a diagrammatic illustration of the variations in the respective straight line thrust and rotary propeller movements and the resultant uniformity or evenness of movement produced by the combination of movements.

In the several views 2 represents a boat provided with a driving shaft 3, that may be rotated by any suitable means, as by means of belt and pulley 4, and cranks 5 and 6 to which are connected pitmen 7 and 8 pivoted on a cross-head 9 that is slidable in or on bearings 10 and 11. A hollow propeller shaft 12 passes through a bore 13 in the cross-head and has shrunk, or otherwise secured thereto, a pair of collars 14 and 15 which engage opposite sides of the cross-head and permit rotary movement of the shaft relative to the cross-head. The shaft 12 is supported on suitable bearings, such as bearings 16 and 17 within the boat, a bearing 18 at the rear end and a support 19 for a bearing rod 12' which engages the bore of the shaft 12 and on which its rear end slides. On the shaft 12 is a screw 20 with a helical blade, the pitch, inclination, and area of which will be adjusted to meet and compensate for the variations in the thrust movements of said propeller and its shaft so as to effect a smooth and uniform motion or to obviate undue vibrations.

Referring, now, to the means herein shown for transmitting rotary movement to the shaft 12 and its propeller 20. In Figs. 3 and 4 is shown on an enlarged scale one of the mechanisms I have devised for this purpose. In the pitmen 8 and 7 are openings 21 and 22 in which I have placed well known "universal" joint connections 22' and 23' and the outer ends of bent lever-arms 23 and 24 having rings or collar portions 25 and 26 which encircle the shaft 12 and fulcrum said levers upon said shaft on opposite sides of a pair or ratchet wheels 27 and 28 that are keyed to the shaft. Adjacent to the respective ring or fulcrum portions of the levers 23 and 24 are pawl-carrying and pawl-adjusting rings, and all of said rings are held against movement along the shaft by means of retaining collars 29 and 30 secured to the shaft 12 in any suitable manner, as, for instance, by means of key-pins 31 and 32.

In the lever 23 is a transverse bore in which is secured a shaft 33 the ends of which project from opposite sides of said lever. On one end of the shaft 33 and at one side of the lever 23 is fulcrumed a pawl-carrying and pawl-adjusting lever member in the form of a T, the shank or stem 34 of which is pivoted at 35 on a lug 36 which projects from the periphery of a lever ring 37 which rotatably encircles the shaft 12 between the retaining collar 30 and the fulcrum ring 26 of the lever 23. A pair of pawl-operating spindles 38 and 39 are secured to and project from one side of arms 40 and 41 which are the "cross-bar" of said T. The free ends of these spindles engage slots 42 and 43 in a pair of pawls 44 and 45 that are pivoted on the opposite end of the shaft 33 and at the side of the lever 23 opposite to the T side, as shown plainly in Fig. 4. Another spindle 46 is secured to the shank portion 34 of the T, and to permit movement of the latter on its axis 35 when the ring 37 is adjustably rotated, said lever 23 has therethrough a slot 47 in which the spindle 46 may move and through which it is projected from the T at one side of the lever to the opposite or pawl side where it serves as an anchor post for the adjacent ends of a pair of pawl-tensioning springs, namely, a spring 48 extending from the post 46 to the pawl 44 to which its opposite end is secured at 49, and a similar spring 50 that is connected to a stud 51 on the pawl 45. On the ring 37 which carries the pawl-adjustment T is a handle or lever 52 that is provided with the usual finger lever 53 and connection rod or wire 54 for operating a detent 55. This detent is engageable with either one of two notches 56 and 57 in the periphery of the fulcrum ring of the lever 23, which normally holds the pawl adjustment ring 37 and the lever 23 with its fulcrum ring together as a single member. Relative movement between the two rings will therefore take place only when the handle or lever 52 is moved after release of the detent from the fulcrum ring of the lever 23. The detent is held in engagement with its fulcrum ring notch by means of the usual helical spring 58. As shown in Figs. 2 and 4 each of the levers 23 and 24 is twice bent to substantially aline its power-ends connected with the pitmen, their fulcrum ring portions being on opposite sides of the ratchet wheels, but this particular arrangement and construction may be varied in numerous ways without departing from the spirit of this invention.

With reference to the companion lever 24, its connections with the shaft 12 are substantially identical with the above-described connections for the lever 23. The pawl-adjustment ring for the lever 24 is distinguished from the corresponding ring 37 for the lever 23, by the numeral 59, and its handle or lever is labeled 60. The detent notches for the latter are indicated by 61 and 62 in Fig. 3.

In Fig. 7 are shown three lines, the upper marked "P," which may represent "push" or longitudinal movement of the propeller shaft; the lowest marked "T", representing "turn," or rotary movement, and the intermediate line "M" meaning mean, average or uniform result of the combined "push" and "turn" movements. As shown the graduations on the line P gradually increase from "dead center" of the crank up to its position of 90 degrees therefrom and then gradually decrease to its opposite "dead center" position. On the other hand the line T shows the opposite degrees of motion, the turning movements being greatest when the crank passes its dead centers by reason of the fact that at said "dead centers" the pitman or pitmen have their maximum swing or lateral movement and thereby impart greater movement to the ratchet wheel.

In Figs. 3 and 4 the pawls operated by the lever 24 together with the parts immediately associated therewith, are shown. At the left the pawl 45 actuates the ratchet wheel 27 when the levers 23 and 24 swing downwardly, and the companion pawl 44' on the lever 24 actuates the same ratchet wheel in the same direction on the upward swings of said levers. The pawls 45 and 44' are shown in operative position with reference to the ratchet wheel 27 and thus rotate the shaft 12 in one direction. In order to reverse the rotation of the shaft and its screw the ratchet wheel 27 is rendered inoperative and the ratchet wheel 28 is placed in service. The teeth on the latter are, as shown, directed oppositely to the teeth on the wheel 27 and are actuated by the pawl 44 on the lever 23 and the pawl 45' on the lever 24. The pawls 44 and 45' are moved out of operative position and the pawls 45 and 44' moved into operative position by swinging the levers 52 and 60 out of engagement with the fulcrum ring notches 56 and 62 into engagement with the notches 57 and 61 thereby swinging the pawl adjusting T's and their pawl-notch-engaging spindles on the axes 33 and 33', which causes the spindle 39 to disengage the pawl 45, the spindle 38' to disengage the pawl 45'. At the same time the inward movements of the spindles 38 and 39' in the pawl slots 42 and 43' permit the tension-springs 48 and 47' to draw the pawls 44 and 45 into engagement with the teeth of the ratchet wheel 28.

In the above-described construction and arangement no provision is made for returning the propeller 20 from its Fig. 6 to its Fig. 5 position by screw action, or a sufficiently rapid turning of the shaft 12. The momentum of the screw movement about its axis and the tendency of the screw to move toward the boat, coupled with the action of the water against the screw will return said screw to its inner or Fig. 5 position without material resistance. However the thrust movement may be converted into the desired rotary movement on the return or pull on the screw movement in a number of ways, if desired, in accordance with the general principles of operation disclosed in Figs. 3 and 4.

As shown, the propeller or screw employed in the present connection is a continuous helical blade from its shaft to its outer circle of rotation, and therefore presents a thrust surface to the water that is several times that of the ordinary propeller with two or three blades and the large spaces between them which are made necessary by the screw action of propulsion. In the present invention the screw is primarily a straight-thrust disk in screw form that with its rotary motion corrects the crank motion and facilitates the return of such a thrust disk to its inner or starting point. Practical navigators have computed that the ordinary separated blades propeller loses at each of its revolutions the distance that it would theoretically move the vessel if the screw worked through fixed screw-threads instead of the unstable water, and the greater the length of the propeller blade the greater its resistance leverage against its rotating power. In the present invention there are no open spaces between center and circumference and the inclination of the blade presented to the water against which it pushes, which tends to permit the water to slip over the blade, is counteracted by the rotary movement of my propeller, and the diameter of the screw blade does not affect the aforementioned anti-rotation leverage in the substituted thrust movement. I estimate that a crank 6 in my invention with a diameter of seven feet will propel a given ship the same distance that the ordinary 21 foot diameter propeller will move it.

Looking at Figs. 1 and 2, the closer the pawl and ratchet mechanism is placed to the crank shaft 3 the greater the rotating sweep of the pitmen and the greater therefore the rotation of the shaft 12, which rotation, of course, must be with reference to the pushing power of the shaft 12. The relative pushing and screw movements are also adjustable by variations in the lengths of the arms 23 and 24. In other words, the closer the pitmen 7 and 8 are arranged to the shaft 12 the greater the ratchet movement. The larger the diameter of the screw the greater its pushing power and the less will be the pitch required in said screw.

While for the purpose of illustrating the double action of the propeller shaft and screw, only one such shaft and screw need be shown, it will be understood that uniform movement of a ship requires at least two screws, one moving outward while the other is returning to the starting point, or Fig. 5 position.

Having thus described my invention, I claim as new and desire to secure by Letters Patent—

1. The combination with a screw propeller, of means for imparting an inward pull and an outward push movement thereto along the line of its axis, and means for rotating said propeller during its outward push movement, said propeller being free of said rotating means during its inward pull movement.

2. The combination with a propeller, of a propeller shaft, means for imparting a reciprocating thrust movement to said shaft, and means operative only during one direction of thrust movement for rotating said propeller.

3. The combination with a propeller, of a shaft to which said propeller is secured, a crank and pitman connection for and with said shaft for moving same to and fro along its axis, and means for converting the reciprocating movements of said connection into a rotary movement in said shaft.

In testimony whereof I have hereunto signed my name.

ERIK J. YOUNGQUIST.